US007714250B2

(12) United States Patent
Borgoltz et al.

(10) Patent No.: US 7,714,250 B2
(45) Date of Patent: May 11, 2010

(54) SYSTEM AND METHOD OF MACHINING OBJECTS USING A LASER

(75) Inventors: Jean-Philippe Borgoltz, Saint Vrain (FR); Richard Renaud, Nanteau sur Lunain (FR)

(73) Assignees: Commissariat a l'Energie Atomique, Paris (FR); Renaud Lasers, Nemours Cedex (FR)

( * ) Notice: Subject to any disclaimer, the term of this patent is extended or adjusted under 35 U.S.C. 154(b) by 456 days.

(21) Appl. No.: 10/518,532

(22) PCT Filed: Jul. 8, 2003

(86) PCT No.: PCT/FR03/02120

§ 371 (c)(1),
(2), (4) Date: Dec. 30, 2004

(87) PCT Pub. No.: WO2004/007136

PCT Pub. Date: Jan. 22, 2004

(65) Prior Publication Data

US 2005/0205539 A1 Sep. 22, 2005

(30) Foreign Application Priority Data

Jul. 11, 2002 (FR) .................................. 02 08742

(51) Int. Cl.
*B23K 26/02* (2006.01)
*B23K 26/00* (2006.01)

(52) U.S. Cl. ............................ 219/121.83; 219/121.85; 219/121.67; 219/121.68; 219/121.69; 219/121.72

(58) Field of Classification Search ............ 219/121.83, 219/121.68, 121.69, 121.67, 121.85, 121.6, 219/121.72
See application file for complete search history.

(56) References Cited

U.S. PATENT DOCUMENTS 5,369,493 A * 11/1994 Tomita et al. ............... 356/400
6,489,985 B1 * 12/2002 Brodsky et al. ............. 347/247
2001/0014543 A1 * 8/2001 Chiba et al. ................. 438/758

FOREIGN PATENT DOCUMENTS

WO      01 07195      2/2001

* cited by examiner

*Primary Examiner*—M. Alexandra Elve
(74) *Attorney, Agent, or Firm*—Oblon, Spivak, McClelland, Maier & Neustadt, L.L.P.

(57) ABSTRACT

A system for machining objects using a laser, including a supply of objects, an object support tray, a galvanometric head, a laser source, and a computer on which a shape recognition software is installed. The galvanometric head includes a first wide field camera, with a first filter located at the output of the first camera, a second narrow field camera, with a second filter located at the output of the second camera, guide mirrors, and a lens that displays at least one object or the part to be machined, located on the support tray.

9 Claims, 5 Drawing Sheets

SYSTEM AND METHOD OF MACHINING OBJECTS USING A LASER

TECHNICAL DOMAIN

This invention relates to a system and a method for machining objects using a laser, including shape recognition. This method may be used particularly for marking, welding, drilling, cutting and heat treatment by laser.

STATE OF PRIOR ART

The domain of the invention is machining, for example for high speed marking or welding of very small objects including prepositioning of the reference surface and automatic recognition of the location to be machined (position-orientation). The orientation of objects may be random but without overlap.

Marking of objects without adding paint or other elements provides a means of maintaining the "medical" quality of marked objects or the "electronic" cleanliness quality.

There are many marking methods, using paint, ink jet, sanding, etc. But none are capable of marking small objects or objects with a complex geometry.

Furthermore, the object is contaminated by paint, and positioning prior to marking is necessary and this is expensive under industrial conditions.

There is no method according to prior art capable of simultaneously performing welding, assembly and marking operations.

Existing laser machines do not have a sufficiently fine beam to satisfy the need for fine marking. Beam divergences are much too high, which limits the use of laser machines for marking.

Thus, a typical existing laser marking centre may comprise:
- a YAG laser Q-switched type laser source pumped by a continuously operating krypton lamp with a power of 50 to 70 W, with a galvanometric head for beam displacement along the X and Y axis, a flat field focusing lens with a focal length of 200 to 300 mm. The height of characters to be marked with a laser beam of approximately 80 µm is rarely less than 500 µm to 600 µm. The energy involved is too high to prevent deformations of delicate parts.
- a computer using software for printing the various alphanumeric characters, logos, bar codes, scale coefficients, etc.
- an integration frame comprising the following in particular:
  - a laser source support with movement along a Z axis (focal length adjustment axis),
  - a protective safety plate,
  - a loading-unloading station for objects to be marked, with specific or integrated placement in the manufacturing line,
  - table with XY cross-movements,
  - ±180° or slaved rotating tray,
  - theta rotation unit, etc.,
  - a fumes suction hood,
  - an atmosphere regulation nozzle.

The dimension of laser sources and the necessary equipment for smooth operation necessitate large machines. The micromechanics industry is usually performed in clean rooms in which the number of dust particles per cubic meter is limited, and therefore these rooms are expensive.

- a part loading station, that usually includes a plane table often made of anodised aluminium, on which the customer himself positions placements according to his own design.

Traditionally, these placements do not require high precision, since the parts to be marked are large and the location to be marked is not precise (±2 mm).

A well-adapted software can be used to mark several parts on the same placement by repetition of marking files at a given pitch.

But the positioning precision and the orientation of parts under the laser beam for marking fine parts necessitate a difficult and expensive operation, in terms of tooling and handling. This results in very high laser marking costs, and therefore not feasible. Consequently, quality and management systems such as ISO 9001 cannot be used for very small parts or parts with complicated shapes.

The purpose of the invention is to solve this problem.

PRESENTATION OF THE INVENTION

The invention relates to a system for machining objects using a laser beam, characterised in that it comprises:
- a supply of objects with prepositioning on their reference surface,
- an object support tray,
- a galvanometric head comprising:
  - a first wide field camera with its focusing cell, with a first filter located at the output from the camera,
  - a second narrow field camera with its focusing lens, with a second filter located at the output from the camera,
  - a guide mirror,
  - galvanometric deflection mirrors,
  - a lens that displays at least one object located on the tray.
- a laser source,
- a computer on which a shape recognition software is installed for checking operation of the said first camera, the said second camera, the said laser source and movement control means for the said galvanometric head (XYZ).

Advantageously, the said system comprises first and second reflecting galvanometric mirrors, a retractable mirror, a flat field lens, a belt carrying objects to be machined, and a reactive gas source close to the tray.

The first two pivoting reflecting mirrors can be replaced by a single mirror on a swivel support, to make the system more compact.

In one example embodiment, the filter at the output from the first camera allows a wavelength of about 600 nm to pass, the laser source is a source with a wavelength of about 1064 nm, the filter at the output from the second camera allowing such a wavelength to pass.

Machining may correspond to marking, welding, drilling, cutting or heat treatment.

The invention also relates to a method for machining objects using a laser comprising an object support tray, a galvanometric head, a laser source, and a computer, the said method including steps to:
- deposit objects, positioned on their reference face, on the said tray,
- display of all these objects in wide field, with identification of each object with its position and its orientation,
- display the area to be machined in narrow-field with high resolution, on one of the objects,
- machining of this object using a beam output from the laser source.

Machining fineness of the order of a few micrometres makes high quality monitoring of very small complex or identified objects possible. Marking may also follow a complex topology. The optical recognition system can produce a quality sheet (photo-marking) for each object if necessary.

The presence of two cameras (one wide field and the other narrow field) improves the fineness and the accuracy of machining.

The invention is also capable of marking a large quantity of objects without stopping, including display and shape recognition of the objects (reading is also possible). These small objects are then traceable.

The invention can also be used for welding and the associated marking (electronic). This technique is inexpensive: it can be used for high speed treatment of parts. It does not contaminate objects: it uses substrate combination properties with a particular gas. Therefore it is well adapted to biomedical or electronic products.

The invention may be applied simply to food, household or automobile products and replace the quality signature for a manufacturing stage.

The optical part system and galvanometric scanning can be coupled to enable machining in any position.

In summary, the method according to the invention has many advantages:
non-contamination of surfaces and no need for the addition of products (medical, watch-making, etc.),
fineness and quality of machining and choice of the resolution,
high speed due to shape recognition and beam scanning by galvanometric mirror (no movement or positioning of parts),
possibility of machining three-dimensional parts with auto-focussing,
possibility of "artistic" markings (complex drawings),
possibility of reading a barcode and computer interpretation of a part number or reject code,
very low unit cost and machining of parts impossible to execute at the present time,
quality control,
welding of very small objects and on-line marking, with integrated quality control.

DETAILED PRESENTATION OF PARTICULAR EMBODIMENTS

Figure 1:
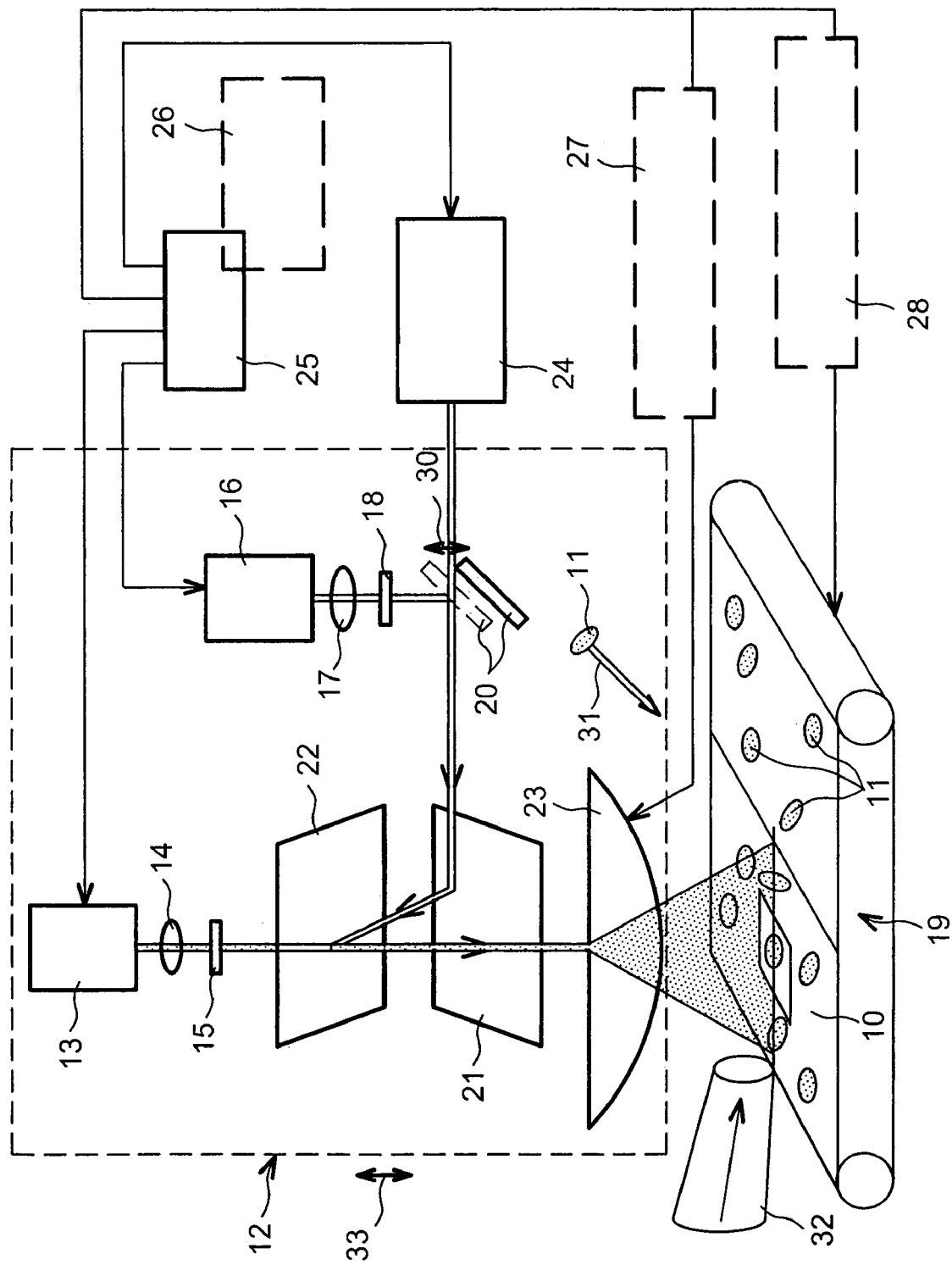
FIG. 1 illustrates a general diagram of the system according to the invention.

As illustrated in FIG. 1, the system according to the invention comprises:
a tray 10 supporting objects 11, for example consisting of a belt 19 supplied with the said objects 11,
a galvanometric head 12 comprising:
a first wide field camera 13 with its associated lens 14, at the output of which there is a first filter 15 allowing a first wavelength $\lambda 1$ to pass through,
a second narrow field camera 16 with its associated lens 17, at the output of which there is a second filter 18 allowing a second wavelength $\lambda 2$ to pass through,
a guide mirror 20,
galvanometric mirrors 21 and 22,
a lens 23,
a laser source 24 operating at wavelength $\lambda 2$,
a computer 25 on which a shape recognition software 26 is installed to check operation of the said first camera, the said second camera, the said laser source and means 27 and 28 of controlling movement of the said galvanometric head and the said tray 10.

In the embodiment illustrated in FIG. 1, the system according to the invention comprises more precisely:
first and second galvanometric reflecting mirrors 21 and 22,
a reflecting mirror 20 retractable following a movement 30,
a flat field lens 23,
a reactive or protective gas source 32 located close to the tray.

The method according to the invention includes the following steps.

In a first step, the objects 11 to be machined are deposited on their reference surface (arrow 31) on the object support tray 10.

They are then automatically brought into the field of the first wide field camera 13, as illustrated in FIG. 1.

Therefore, the optical path for the wide field display of all objects located on the tray 10 is as follows:
first camera 13,
passage through the focusing lens 14,
passage through the first filter 15,
passage through the galvanometric mirror 22,
passage through the lens 23.

The image analysis "counts" and "orients" objects 11 in a general coordinate system. All these objects are displayed, each is identified with its position and a characteristic point of each object is stored (for example its centre of gravity G), with its orientation.

This first camera 13 looks at the tray 13 and the objects 11 deposited on the tray through the mirror 22 and the lens 23. The superposition of the reference image and the object(s) 11 seen is located in this field. The useful area(s) is (are) recorded in X and Y coordinates.

Figure 2:
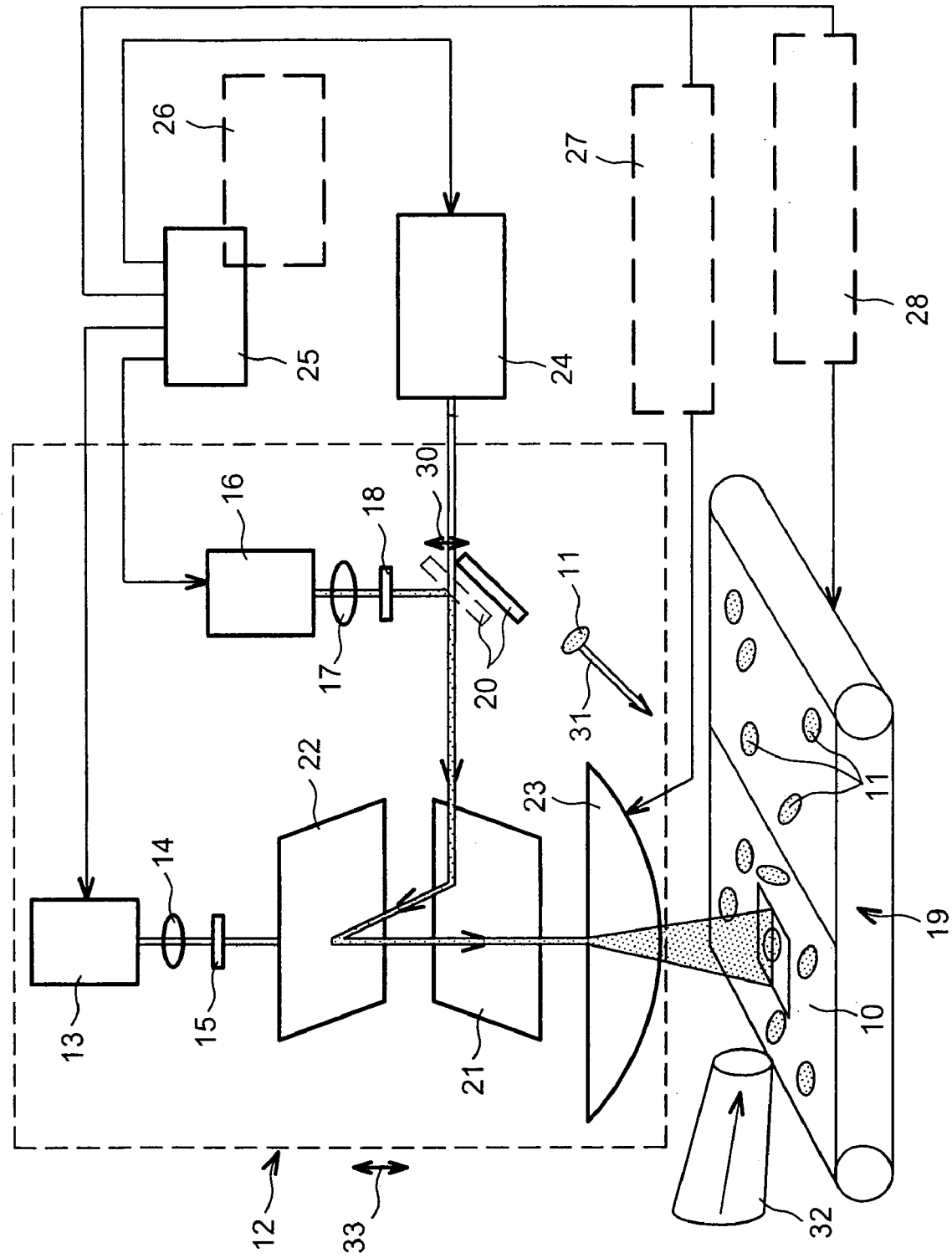
FIGS. 2 and 3 illustrate steps in the method according to the invention.

As illustrated in FIG. 2, in a second step the second camera 16 displays the useful area(s) in X, Y coordinates as given above on a smaller field through the retractable reflecting mirror 20, the galvanometric mirrors 21 and 22 and the lens 23.

Therefore, the optical path for the narrow field display of the part of an object to be machined is as follows:
second camera 16,
passage through the focusing lens 17,
passage through the second filter 18,
reflection on the retractable mirror 20,
reflection on the mirror 21,
reflection on the mirror 22,
passage through the lens 23.

The reference image and the first object seen with high precision are superposed, within a few microns.

Once this area has been perfectly identified, the mirror 20 is retracted by a linear or rotary movement 30 in a manner well-known to those skilled in the art, and the shape recognition system according to the invention chooses this first object and places it in the coordinate system of the second narrow field camera 16 so as to determine the coordinates of the start point and the machining orientation.

The computer 25 adjusts focusing (z) of movement 33. The galvanometric mirrors 21 and 22 are oriented to perform machining using the laser beam 24 through the lens 23.

The object 11 is then replaced and the system returns to the previous step to place a second object 11 in the coordinate system of the second camera 16.

The optical system and the quality of the movements depend on the machining area field covered by mirrors 21 and 22, due to the size of the objects 11 to be machined. The quality of the laser source 24 (focusing, wavelength) depends on the material to be machined. The reactive or protective gas (source 32) and its flow depend on the nature of the object 11.

Figure 3:
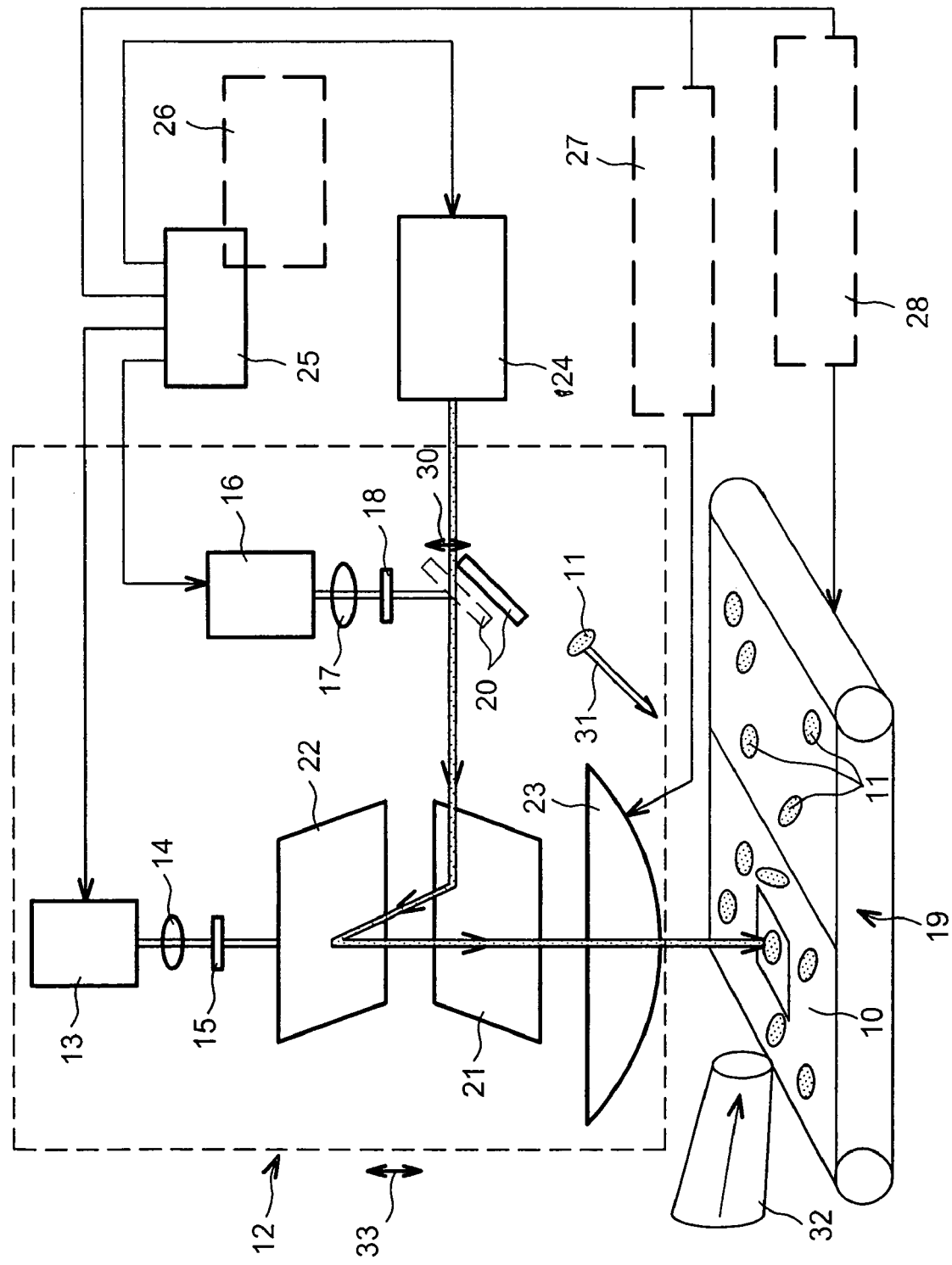

As illustrated in FIGS. 1 to 3, the object support surface may be formed from several trays on a moving belt 19, but this may simply be a simple support on which the objects 11 are brought in.

Another possibility consists of installing the system according to the invention on an assembly machine.

Figure 4:
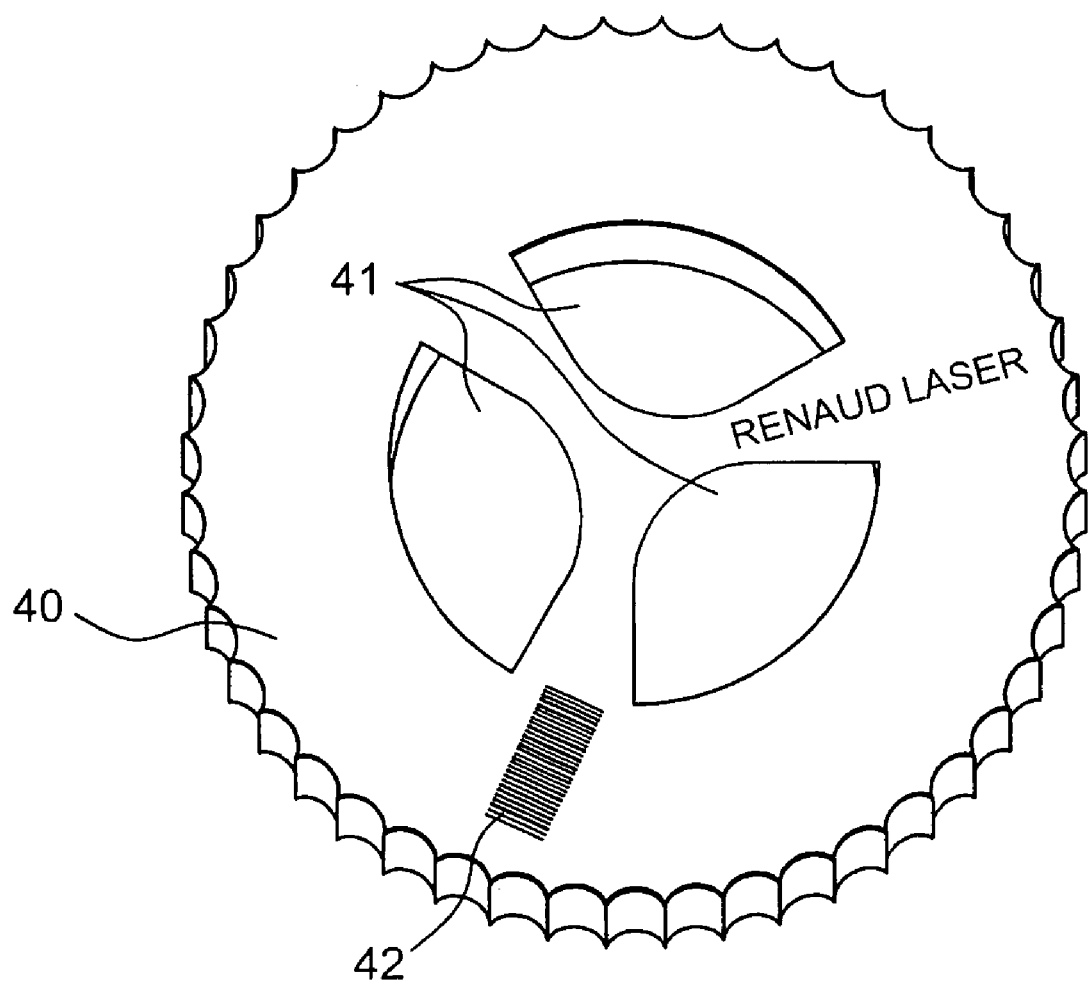
FIGS. 4 and 5 illustrate two example embodiments of the method according to the invention.

FIGS. 4 and 5 illustrate two example embodiments of the method according to the invention, for marking and welding respectively.

FIG. 4 shows a top view of a toothed wheel 40 forming an object to be marked. The wheel 40 includes recesses 41. For a wheel diameter of 5 mm, the distance between successive recesses may be 0.2 mm. The method according to the invention was used to add the marking "RENAUD LASER" in the first space between two recesses. For example, the height of a character in this marking may be 50 μm and the line thickness may be 10 μm. Reference 42 denotes a barcode entered between two recesses using the process according to the invention.

Figure 5A:
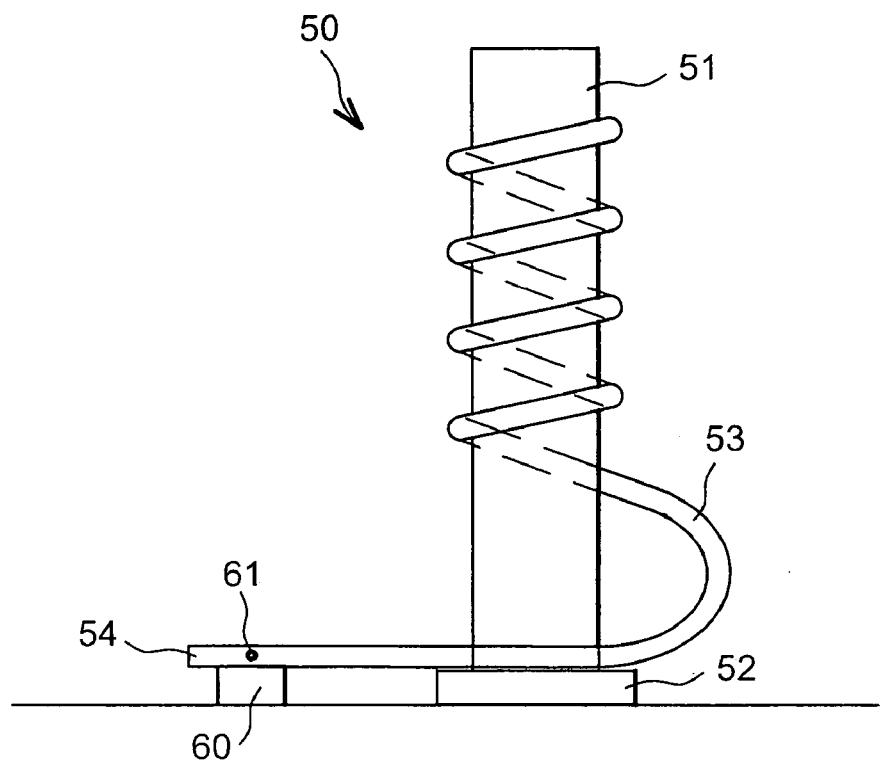
Figure 5B:
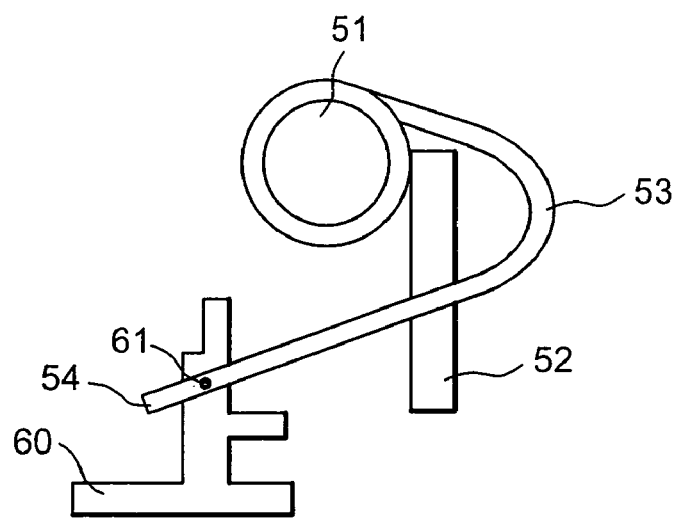

FIG. 5 comprises a FIG. 5A and a FIG. 5B showing an elevation view and a top view respectively of an electric coil 50 and its connecting lug 60. The coil 50 comprises a plastic bar 51 fixed to a support 52 on which the coil reference is marked. A conducting wire 53 is wound onto the bar 51 and its end 54 is placed on the lug 60 to be soldered at 61 using the method according to the invention.

Example Embodiment

In one advantageous example embodiment, the system according to the invention comprises the following various elements:
 camera 13: Display of a wide field of about 80 mm×80 mm, with:
  number of rows: 768
  number of columns: 494
  wavelength: about 690 nm
  objective 14: focal length 8 mm
 Filter 15:
  transparent for wavelength λ1: about 690 nm
 Mirror 22:
  face located on the side of the camera 13, transparent for wavelength 690 nm
  other face: reflecting for wavelength 1064 nm
 Lens 23:
  Focal length: 163 mm
 Camera 16: Display a narrow field about 10 mm×8 mm, with:
  Number of rows: 768
  Number of columns: 494
  Wavelength: about 1064 nm
  Objective 17: focal length 100 mm
 Filter 18:
  Transparent for wavelength λ2 about 1064 nm
 Retractable mirror 20:
  Retractable mirror reflecting for 1064 nm
 Mirror 21:
  Mirror reflecting for 1064 nm
 Laser source 24: YAG laser pumped by diode
  Beam quality: focal spot 14 micrometers
  Q-switched laser
  Frequency: from 0 to 100 kHz
  Output beam diameter: 20 mm
  Power in fundamental mode TEM00: <5 watts.
 Other laser sources are also possible:
 solid lasers
  pulsed YAG laser
  continuous YAG laser
  YAG laser with double, triple or quadruple frequency
 Gas lasers
  CO2 laser
  excimer laser.

The invention claimed is:

1. A system for machining objects using a laser beam, comprising:
 an object support tray to convey an object with prepositioning on a reference surface;
 a laser source;
 a galvanometric head comprising:
  a wide field camera with a focusing lens, with a first filter located at an output from the wide field camera,
  a narrow field camera with a focusing lens, with a second filter located at an output from the narrow field camera,
  a guide mirror moveable between a first position and a second position, the first position blocking an output of the laser and reflecting light to the narrow field camera or the wide field camera, the second position not blocking the output of the laser source,
  galvanometric deflection mirrors, and
  a lens that displays at least one object located on the tray,
  wherein the wide field camera, the narrow field camera, and the laser source are disposed to use partly a same optical path that includes the galvanometric deflection mirrors and the lens that displays at least one object located on the tray;
 a computer on which a shape recognition software is installed for checking operation of the wide field camera, the narrow field camera, the laser source, and movement control means for the galvanometric head,
 wherein the computer is configured to determine first location coordinates of an object in an image of the wide field camera in a first coordinate system, to determine second location coordinates of the object in an image from the narrow field camera in a second coordinate system, and to determine a relationship between the first location coordinates and the second location coordinates.

2. A system according to claim 1, comprising first and second reflecting galvanometric mirrors.

3. A system according to claim 1, wherein the lens that displays at least one object located on the tray is a flat field lens.

4. A system according to claim 1, comprising a belt carrying objects to be machined on their reference surface, preceded by a pre-positioning supply for parts.

5. A system according to claim 1, comprising a reactive gas source close to the tray.

6. A system according to claim 1, wherein the first filter at the output from the wide field camera allows a wavelength of about 600 nm to pass.

7. A system according to claim 1, wherein the laser source is a source with a wavelength of about 1064 nm, the filter at the output from the narrow field camera allowing such a wavelength to pass.

8. A system according to claim 1, wherein machining corresponds to marking, welding, drilling, cutting, or heat treatment.

9. A method for machining objects using a laser including an object support tray, a galvanometric head, a laser source, and a computer, the method comprising:

depositing objects, positioned on their reference face, on the tray;

displaying all the objects in wide field by using a wide field camera, with identification of each object with its position and its orientation;

displaying an area to be machined in narrow field by using a narrow field camera with high resolution, on one of the objects;

moving a guide mirror in the galvanometric head from a first position to a second position, the first position blocking an output of the laser and reflecting light to the narrow field camera, the second position not blocking the output of the laser, machining the object using a beam output from the laser source, wherein the wide field camera, the narrow field camera, and the laser source are disposed to use partly a same optical path that includes galvanometric deflection mirrors included in the galvanometric head and a lens that displays at least one object located on the tray included in the galvanometric head.

* * * * *